United States Patent [19]
Klein et al.

[11] Patent Number: 5,499,364
[45] Date of Patent: Mar. 12, 1996

[54] SYSTEM AND METHOD FOR OPTIMIZING MESSAGE FLOWS BETWEEN AGENTS IN DISTRIBUTED COMPUTATIONS

[75] Inventors: Johannes Klein, San Francisco; Francis R. Upton, IV, Saratoga, both of Calif.

[73] Assignee: Digital Equipment Corporation, Maynard, Mass.

[21] Appl. No.: 138,451

[22] Filed: Oct. 14, 1993

[51] Int. Cl.⁶ .......................... G06F 15/163; G06F 17/10
[52] U.S. Cl. .............. 395/200.03; 395/650; 364/DIG. 1; 364/280.6; 364/281.3
[58] Field of Search ........................ 395/200.03, 200.12, 395/200.13, 200.18, 650

[56] References Cited

U.S. PATENT DOCUMENTS

| | | | |
|---|---|---|---|
| 4,503,499 | 3/1985 | Mason et al. | 364/200 |
| 4,769,771 | 9/1988 | Lippmann et al. | 364/200 |
| 4,819,159 | 4/1989 | Shipley et al. | 364/200 |
| 4,891,753 | 1/1990 | Budde et al. | 364/200 |
| 4,903,196 | 2/1990 | Pomerene et al. | 364/200 |
| 4,926,323 | 5/1990 | Baror et al. | 364/200 |
| 5,021,945 | 6/1991 | Morrison et al. | 364/200 |
| 5,325,528 | 6/1994 | Klein | 395/650 |
| 5,329,626 | 7/1994 | Kein et al. | 395/650 |
| 5,361,369 | 11/1994 | Kametani | 395/800 |
| 5,371,889 | 12/1994 | Klein | 395/650 |
| 5,442,791 | 8/1995 | Wrabetz et al. | 395/650 |

FOREIGN PATENT DOCUMENTS 0251584  6/1987  Canada .......................... G06F 9/46

OTHER PUBLICATIONS

Time, Clocks, and the Ordering of Events in a Distributed System, *Communications of the ACM*, vol. 21, No. 7, Jul. 1978, pp. 558–565, Leslie Lamport.
Concurrency Control in Distributed Database Systems, *Computing Surveys*, vol. 13, No. 2, Jun. 1981, pp. 187–221, Philip A. Bernstein and Nathan Goodman.
Analyzing Concurrency Control Algorithms, *IEEE Trans. on Software Eng.*, vol. SE-9, No. 3, May 1983, pp. 233–239, P. A. Bernstein, N. Goodman and Ming-Yee Lai.
Implementing Atomic Actions on Decentralized Data, *ACM Transactions on Computer Systems*, vol. 1, No. 1, Feb. 1983, pp. 3–23, David P. Reed.
Nested Transactions, An Approach to Reliable Distributed Computing, *MIT Press Series in Inf. Systems, US, Cambridge, MIT Press*, 1985, pp. 68–95, J. E. B. Moss.

(List continued on next page.)

*Primary Examiner*—Thomas G. Black
*Assistant Examiner*—John C. Loomis
*Attorney, Agent, or Firm*—Denis G. Maloney; Arthur W. Fisher

[57] ABSTRACT

A distributed computation system has a set of agents that perform each specified distributed computation. State transition events in each agent are conditioned or dependent on state transition events in other ones of the agents participating in the same distributed computation. The event dependencies between events in the agents are dynamically specified at run time from a set of predefined dependency types. The assigned conditions for resolving the truth value of these events are stored in local knowledge databases in each of the agents. Each agent stores in its local knowledge database a representation of the conditions for local events, which are state transition events in that agent, and a representation of the conditions for those external events that depend on notifications of local events in this agent and for those external events on which the local events are dependent. The local knowledge database also stores status information on the current truth value of the local and external events. Event notifications are sent by each agent when the truth value of a local event is changed. Whenever the truth value of a local event changes the agent inspects the local knowledge database to identify external events that depend on the local event. Notifications of events that are known, based on knowledge available to the agent, to be insufficient to resolve an external event's truth value are delayed or withheld until all the local events required to resolve the external event's truth value have been assigned final truth values.

16 Claims, 4 Drawing Sheets

OTHER PUBLICATIONS

Optimistic Concurrency Control for Abstract Data Types, ACM, 1986, pp. 206–217, Maurice Herlihy.

Transaction Processing Primitives and CSP, *IBM J. Res. Develop.*, vol. 31, No. 5, Sep. 1987, pp. 535–545, J. C. P. Woodcock.

On the State of Affairs in OSI Transaction Processing, *IEEE*, Ch. 2547, 1988, pp. 53–61, Jürgen M. Janas and H. Rüdiger Wiehle.

Superdatabases for Composition of Heterogeneous Databases, *IEEE*, Ch. 2550, 1988, pp. 548–555, Calton Pu.

A Distributed Commit Protocol for a Multicomputer System, *IEEE Trans. on Computers*, vol. 39, No. 5, May 1990, pp. 718–724, P. Ancilotti, B. Lazzerini, C. A. Prete and M. Sacchi.

SYSTEM AND METHOD FOR OPTIMIZING MESSAGE FLOWS BETWEEN AGENTS IN DISTRIBUTED COMPUTATIONS

The present invention relates generally to distributed processing computer systems in which a distributed application is performed by multiple processes or agents that coordinate their computations by exchanging messages. More particularly, the present invention relates to a system and method in which each agent maintains a store of local knowledge concerning the state variables in other agents and uses that local knowledge store to determine when messages that would normally be sent to other agents can be omitted or delayed.

BACKGROUND OF THE INVENTION

The present invention is related to U.S. patent application Ser. No. 07/601,990, filed Oct. 23, 1990, now U.S. Pat. No. 5,329,626, entitled Rule Driven Transaction Management System and Method, which is assigned to the same assignee as the present invention and which is hereby incorporated by reference.

Referring to FIG. 1, the present invention concerns interactions and interdependencies of agents 102-1 through 102-N cooperating in a distributed processing computer system 100. Depending on the operating system used, each agent 102 may be a thread or process, and thus is a unit that executes a computation or program. Some of the agents 102-1 through 102-N may be executing on one data processing unit while others are executing at remote sites on other data processing units. More generally, agents can be hosted on different computer systems using different operating systems. For the purposes of the present discussion, it is sufficient to assume that there is a communications path or bus 110 which interconnects all the agents in the system 100.

In addition to agents which represent computer processes, a distributed system 100 may also include agents which represent "external" devices 104. The infrastructure of a distributed computer system also contains, among other well known components, journal services (herein called journal processes) 106 that record state information on stable, non-volatile, storage 108, and at least one restart manager process 109 that restarts other processes in the system after a failure. Application processes use journal services to record state information on stable storage. To further protect from failures, journal processes 106 often store data on two or more non-volatile storage media to compensate for the unreliability of storage devices such as magnetic disks. Typically, data written to a journal service is recorded on stable storage in the order received, and the data stored on stable storage cannot be modified, making write operations to stable storage irrevocable operations.

The restart manager process 109 is used when a computer system is powered on or reset after a system or process failure. It uses information stored on stable storage 108 to determine the state in which each application process 102 is to be restarted. A communications path or bus 110 interconnects the various processes 102, 108, 109 and devices 104 in the system 100.

Each agent's application program is, in the context of the present invention, considered to be a finite state machine which progresses through a sequence of internal states. Complex computations are mapped into simpler sets of states suitable for synchronization with other computations.

Application processes execute user-defined programs and synchronize their execution by exchanging messages. In any particular application process, a set of protocols defines the types of messages sent, as well as the applicable constraints thereon—i.e., the circumstances under which each message type is to be sent and/or received. Such constraints define order and coexistence requirements between events (i.e., state transitions).

In commercial data processing systems, transaction processing is one of the most important distributed applications. Transaction processing systems execute a predefined number of protocols. Among them is a protocol which enables components in a transaction processing system to reach agreement on the outcome of a transaction. The protocol is known as the "two phase commit" protocol. Although that is not important to the present discussion, it is important that the use of a fixed number of predefined protocols makes it possible to "optimize message flows" by writing the application software to avoid sending agent-to-agent messages in certain predefined situations.

For instance, the coordinator in a "two phase commit protocol" only sends abort notifications to those participants from which it did not receive an abort notification. Thus the coordinator exploits its local knowledge that those participants already know about the outcome of a transaction and therefore need not be notified.

Other optimizations that can be used in transaction processing systems are concerned with only journaling those message which must be sent reliably, e.g., in the "presumed commit" version of the two phase commit protocol only abort notifications are journaled. See U.S. patent application Ser. No. 08/051,523, filed Apr. 22, 1993, now U.S. Pat. No. 5,371,889 which is hereby incorporated by reference. An agent which voted "yes" on the outcome of a transaction infers commitment of the transaction from not receiving an abort notification. The coordinator by knowing when participants are enabled to vote on the outcome of a transaction delays journaling actions until sending "request-to-commit" notifications. This avoids journaling actions for those transaction which are aborted before starting the two phase commit protocol. In accordance with the present invention, by exploiting knowledge about an external event's preconditions, other external actions of an agent can be delayed and sometimes avoided altogether.

Most of the above optimizations implicitly exploit knowledge about the state of the other participant. The prior art does not teach how to optimize message flows in a distributed computation system that is not executing a fixed number of predefined protocols for which optimizations can be defined manually.

In the present invention, the protocols which bind the agents of a distributed computation are highly variable because the application program or programs being used specify the agent dependencies to be used from a library of predefined agent dependency types. The messages to be sent between agents of a distributed computation are dynamically determined at run time based on the agent dependencies that the application program has established. As a result, there is no obvious simple method to optimize message flows since one cannot determine what messages to avoid sending until one knows what agent dependencies have been selected.

The present invention is based on the concept that many possible message optimizations in a distributed computation system whose protocols are determined at run time would require knowledge of the status of events associated with the distributed computation and also require each agent to have some knowledge of the event/condition rules used by other ones of the agents. In the Rule Driven Transaction Management System and Method referenced above, protocols between agents are represented by event/condition pairs. Each agent is configured to operate as a finite state machine insofar as other agents are concerned. Upon triggering an event that indicates a state transition, an agent sends a message to all participating agents whose events are constrained by conditions that refer to the triggered event. For example, if an event a in Agent 1 depends on event b in Agent 2, a notification is sent by Agent 2 to Agent 1 (i.e., by the process triggering event b to the process triggering event a) upon the occurrence of event b. In the context of the present invention, agents can also be programmed to send a notification to other agents to indicate that a condition cannot be satisfied.

SUMMARY OF THE INVENTION

In summary, the present invention is a system and method for performing distributed computations. The distributed computation system includes a library of predefined state transition dependencies that can be assigned to the agents executing a distributed computation. At run time, the agent or process that initiates a distributed computation specifies the other agents that are to participate in the distributed computation and also specifies which ones of the predefined state transition dependencies from the library are to be applied to those agents. Thus, the set of dependencies between the agents of distributed computations may vary from one distributed computation to another.

Each agent maintains a local knowledge database that includes a representation of the conditions for local events, which are state transitions in that agent, and a representation of the conditions for certain external events, which are state transitions in other ones of the agents. In particular, each agent stores a representation of the conditions for all local events, all external events that depend on notifications of local events in this agent, and all external events on which the local events are dependent. The local knowledge database also stores status information on the current truth value of the local and external events.

Event notifications are sent by each agent when the truth value of a local event is changed. Those event notifications, each of which indicates the new value of a specified event in a specified agent, are sent to all agents which have state transitions dependent on those events. When an event notification is received from another agent, the event value in the event notification is compared with the data in the local knowledge database to determine if the notification event value is consistent with the information in the local database. If the notification event value is consistent with the local knowledge database, the notification event value is stored in the local knowledge database, and otherwise an error procedure is called.

Whenever the truth value of a local event (i.e., state transition) changes (which typically means that the local event has occurred or will never occur), the system and method of the present invention inspects the information in the local knowledge database to identify all external events that depend on the local event. For each such external event, if the local event is the last local event required by the other agent to set the truth value of the external event, then notifications for all the local events that satisfy the condition for that external event are sent to the other agent. If at least one additional local event whose truth value is still undetermined is required, in accordance with the condition for the external event (as represented by the data in the local knowledge database) to enable or disable the external event, then no notification of the local event is sent to the other agent. As a result, notifications of events that are known, based on knowledge available to the agent, to be insufficient to resolve an external event's truth value are delayed or withheld until all the local events required to resolve the external event's truth value have been assigned final truth values.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

In the context of the present invention, one "finite state machine" is associated with each process or agent participating in a protocol. Each finite state machine is defined in terms of a set of states and state transitions caused by events (such as sending and receiving messages). The occurrence of a specified event causes a state transition and determines a subsequent state. Each "state" represents the status of one finite state machine (i.e., agent).

Figure 1:
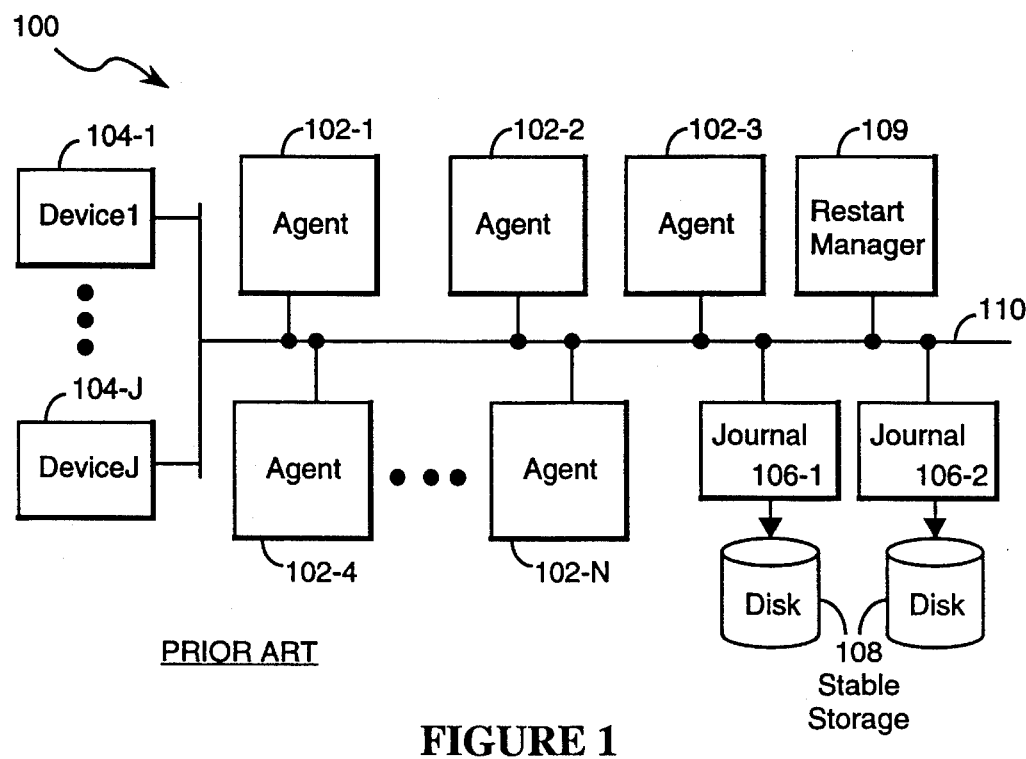
FIG. 1 is a block diagram of a distributed data processing system with a number of interdependent agents.
Figure 2:
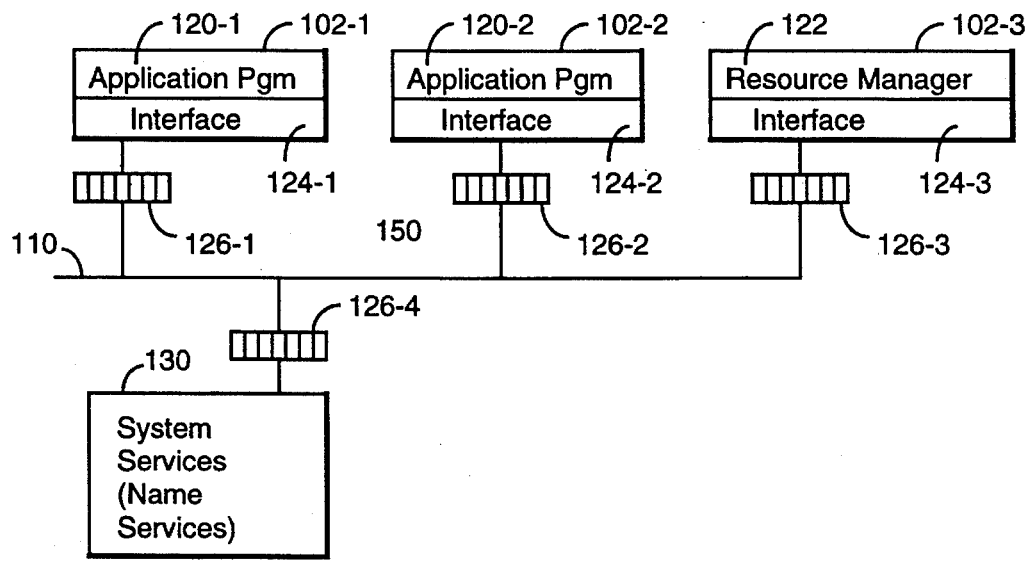
FIG. 2 is a second block diagram of a distributed data processing system with a number of interdependent agents.

Referring to FIG. 2, each agent 102 in the preferred embodiment consists of an application program 120 or resource manager program 122 coupled to an application interface program 124 that implements the state machine for the agent. Each agent also has a message queue 126 for receiving messages. A systems services process 130 provides services such as a name service for locating the network address of a specified agent.

Figure 3:
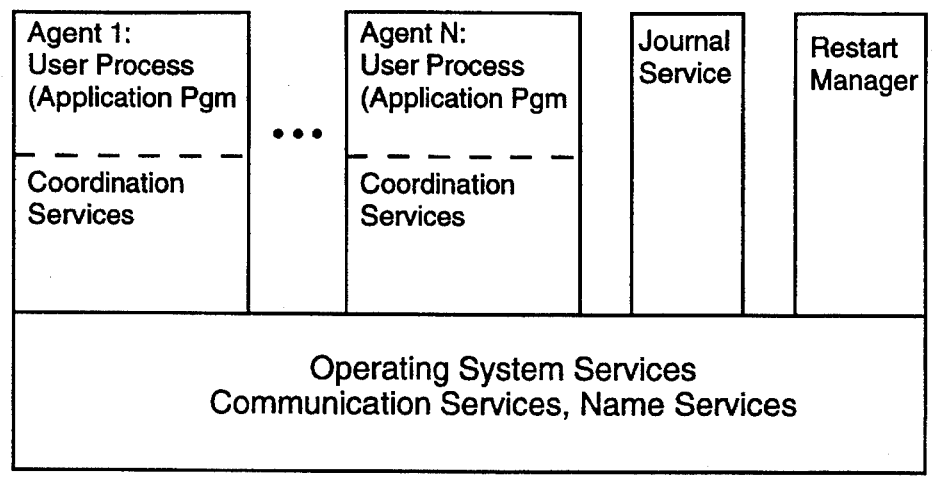
FIG. 3 is a block diagram of the mapping of operating system services and agent processes into a distributed computer system's address space.

Referring to FIG. 3, each agent typically corresponds to an operating system process for executing application programs and for executing a local copy of the interagent communication service programs that form the state machine interface 124 shown in FIG. 2. Each agent or operating system process is given a unique identifier. In case of a failure the agent's unique identifier is also assigned to the process which resumes execution of the same agent.

To send messages to other agents 102, each agent uses the distributed computer system's underlying operating system services, communication services and name services. In particular, it is assumed that the distributed computer system will provide a networking layer, i.e., such as TCP/IP, DECnet or RPC for transmitting messages (such as event notification messages and agent dependency definition messages) between agents. For each agent identified by its unique identifier a port is exported to a name service 130 to allow other agents to locate the exported port and to send notifications to an agent via that port. Those ports may change due to communication and node failures. The unique identifier assigned to an agent allows other agents to always find the current port of a given agent. The present invention assumes the existence of an appropriate name service for the particular networking layer being used. Networking layers and name services are well known those skilled in the art and the present invention could be used with many prior art networking and name services.

Figure 4:
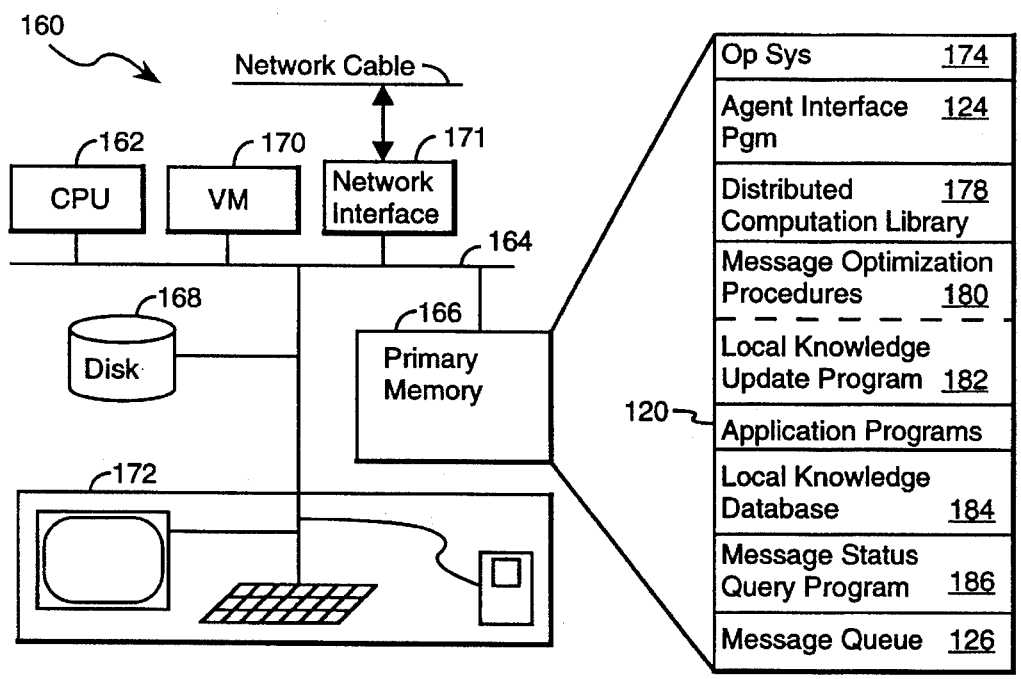
FIG. 4 if a block diagram of a computer subsystem incorporating one or more agents of a distributed computation.

FIG. 4 shows a data processing sub-system 160 (e.g., one computer of a set of interconnected computers) for performing the message optimization process of the present invention and for executing local protocols associated with one or more agents participating in an application process. Data processing system 160 contains the standard computer system components, including a data processing unit (CPU) 162, system bus 164, primary memory 166 (i.e., high speed, random access memory), mass storage 168 (e.g., magnetic or optical disks), virtual memory manager 170, a network interface 171 for sending and receiving messages to other agents and for accessing information stored in shared memory 140 (if any), and user interface 172 (e.g., keyboard, monitor, pointer device, etc.). These physical computer components are not modified by the present invention and are therefore not described in detail herein.

Stored in primary memory 166 are currently executing application programs 120, the above-mentioned finite state machine interface program 124, as well as operating system software 174, a library 178 of agent protocol control programs, and the message optimization procedures 180 of the present invention. The message optimization procedures 180 include a local knowledge updating program 182 for updating a local knowledge database 184. The local knowledge database 184 is described below with reference to FIG. 6.

Figure 5:
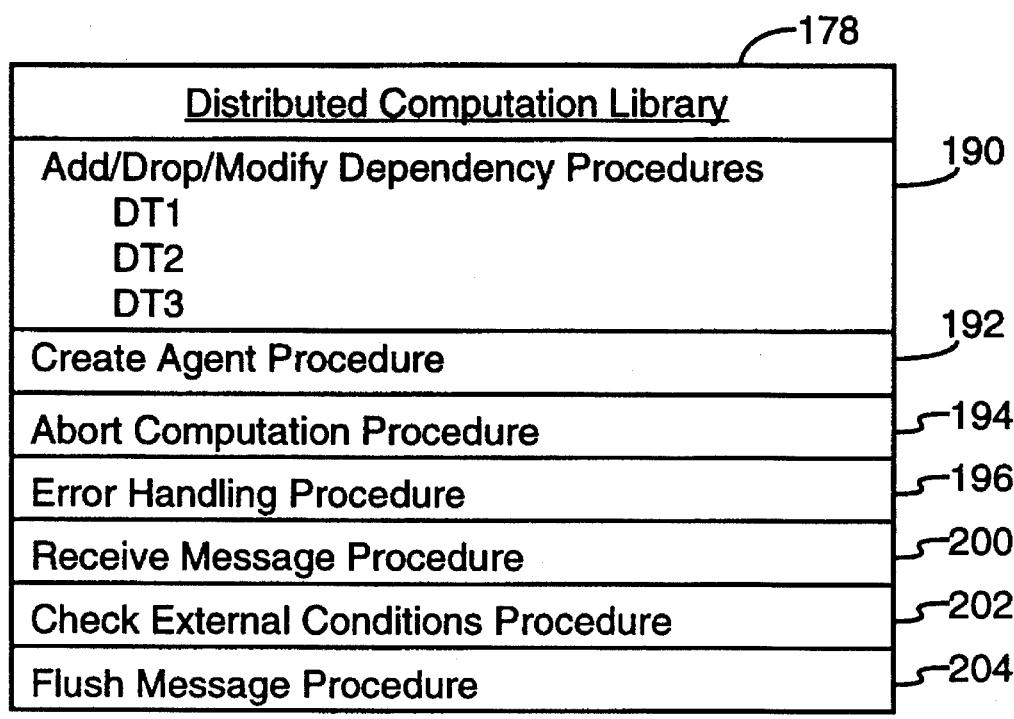
FIG. 5 is a block diagram of the protocol library of control programs used by the computation manager and/or agent interface of the present invention.

Referring to FIG. 5, the library 178 of control programs for distributed computations include a first set of procedures 190 for adding and removing dependencies between specified agents. The preferred embodiment for purposes of explaining the invention has just three types of agent dependencies, herein labeled DT1 (for dependency type 1), DT2 and DT3. The add/drop/modify procedures in the distributed computation library 190 are invoked by each computational agent 102 whose application program initiates a distributed computation or whose application program is assigned the task of creating new computational agents and/or modifying the dependencies between agents. The add/drop/modify dependency procedures 190 modify the contents of the local knowledge databases 184 of the specified agents so as to establish specified dependencies between the specified agents.

The distributed computation library 178 also includes a Create Agent procedure 192 for generating or creating a new computation agent (typically by creating a new instance of a predefined procedure for performing a particular function), an abort computation procedure 194 for aborting or cancelling a distributed computation, and an error handling procedure 196 for processing messages received by an agent that are inconsistent with the agent's internal state. In addition, the distributed computation library 178 includes three procedures that are primarily responsible for implementing the present invention in the preferred embodiment: (A) a receive message procedure 200 for processing event messages received from other agents, (B) a Check External Conditions procedure 202 for determining which external events can be determined to be True or False based solely on locally available information, and (C) a Flush Messages procedure 204 which sends to other agents only those messages which are needed by those other agents to progress to a new state.

SPECIFIC EXAMPLES OF DEPENDENCY TYPES

The invention as described above can be applied to any distributed computation or distributed processing situation in which there is a need to coordinate state transitions among the participating agents. The following is a description of three types of dependencies for a distributed transaction processing system.

In this preferred embodiment, the set of messages which each agent can receive, either from the distributed computation manager, or from another agent, denoted here as Agent X, includes:

| MESSAGE TYPE | DESCRIPTION |
|---|---|
| Request Create | Create a dependency relationship |
| Drop | Drop a dependency relationship |
| Event X.State | X can be any state transition type of event, including Finish and Commit, and their associated truth values (TRUE, FALSE and PROMISE). |

The three types of dependencies used in the preferred embodiment are herein called (1) strong commit dependency, (2) weak commit dependency, and (3) finish dependency.

A strong commit dependency is defined as follows:

$$AGA:Commit \rightarrow AGB:Commit$$

which indicates that Agent A is strong commit dependent on Agent B.

A weak commit dependency of Agent A on Agent B is defined as follows:

$$AGA:Commit \rightarrow AGB:Commit\ .OR.\ not(AGB:Finish)$$

A finish dependency of Agent A on Agent B requires that before Agent A can finish, Agent B must have already finished or it must be known that Agent B will never finish, and thus is defined as follows:

$$AGA:Finish \rightarrow AGB:Finish\ .OR.\ not(AGB:Finish)\ .OR.\ not(AGB:Commit)$$

Notification dependencies are dependencies that indicate messages to be sent to other agents. Each dependency between two agents creates one or more pre-conditions in at least one of the agents. For each such pre-condition in one agent there is a corresponding notification action in the other agent. The notification action is a requirement that a message be sent so as to satisfy a particular pre-condition in a particular agent. Thus, a pre-condition in Agent A which depends on Agent B requires a notification action in Agent B. That notification action, herein called a notification dependency, is invoked when a corresponding event (i.e., state transition) occurs in Agent B, causing Agent B to send an event message to Agent A. For instance, if Agent A is finish dependent on Agent B, then Agent B will have a notification dependency on Agent A, causing it to send a "finish event message" to Agent A when Agent B reaches the finished state. Also, if Agent B aborts prior to finishing, it will send a "Finish:FALSE" message or a "Commit:FALSE" message to Agent A.

In summary, the set of dependencies between agents of a distributed computation are dynamically defined at run time by the agent which initiates a distributed computation, and thus the set of dependencies between the agents of distributed computations can differ from one distributed computation to another.

Local Knowledge Database and Message Optimization Procedures

Figure 6:
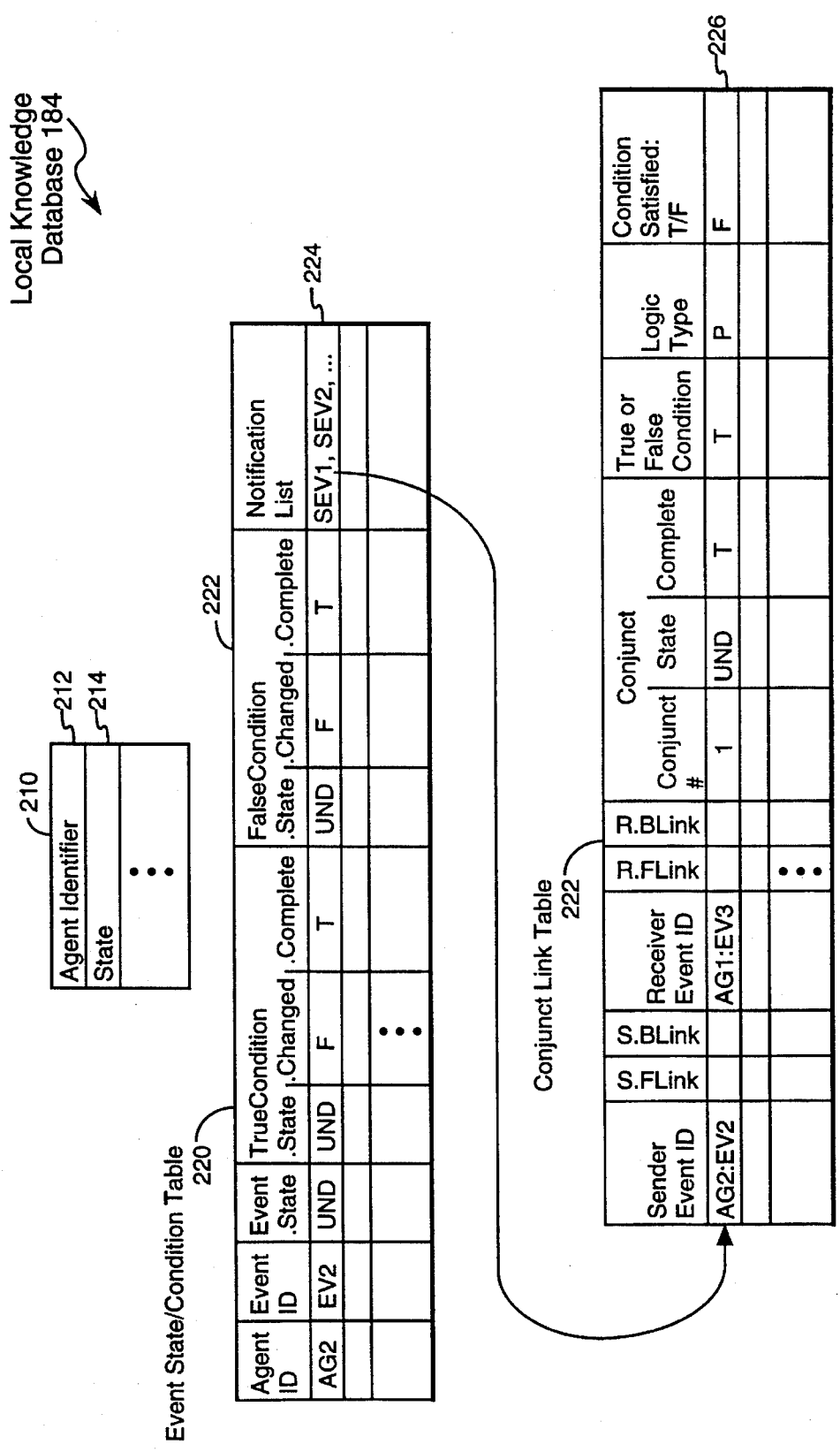
FIG. 6 is a block diagram of the data tables in the local knowledge database in the preferred embodiment of the present invention.

Referring to FIG. 6, each agent maintains a local knowledge database 184. The local knowledge database 184 for a particular agent includes a control block 210 that stores the agent's identifier 212, which is a unique identifier assigned to the agent upon creation of the agent by the transaction manager 130, and the agent's current state 214. The database 184 further more includes an event table 220 that stores information concerning "events", where each event either identifies a state transition triggered by the agent itself, in which case the event is called a local event, or a state transition triggered by another agent, which is called an external event. To coordinate the execution of a set of agents, constraints (also called dependencies) are created among different events. Each dependency defines a condition on the occurrence or non-occurrence of an event in a particular agent. For each event that is relevant to an agent's execution, the agent maintains a list of conditions and a list of notifications. Upon the receipt of a notification that an event has occurred or a notification that an event has not and will not occur, an agent resolves all those conditions which refer to the event.

Upon the occurrence of a local event an agent sends notifications to all those agents whose events have a condition depending on the local event. Those external events are listed in a notification list for the local event. Agents also stored information representing the conditions of local events on external events as well as the known state, if any, of a external event. Before sending notifications, agents check the state of the external event and the state of the condition on which the external event depends.

For instance, if Agent A's state transition from State 1 to State 2 is dependent on Agent B having reached State C, that dependency is denoted in Agent A's local knowledge database 184, and Agent B's local knowledge database 184 will contain an event record that denotes a notification link, as explained below.

Event Table

Referring to FIG. 6, the local knowledge database 184 consists of an event table 220 and a conjunct link table 222. The event table 220 contains one record 224 for each local event and external event that is relevant to the operation of the agent in which the database 184 is located. More particularly, the event table 220 contains event records for (A) all local events that occur in the agent, (B) all external events in other agents that depend on notifications from this agent, and (C) all external events on which local events depend.

The fields of each event record 224 identify the agent in which the event occurs, the event (which is assigned a unique identifier for events in the specified agent), the state of the event, information concerning the status of the conditions for enabling the event to become TRUE or FALSE, and a notification list. Local events are defined to be events in the event table 220 whose Agent ID field is equal to the Agent Identifier 212 in the control block 210 for the Agent corresponding to the local knowledge database.

For each event, the procedures for creating dependencies between agents can define a TrueCondition which identifies when the event can be set to TRUE as well as a FalseCondition which identifies when an event can be set to FALSE. However, in many circumstances only a TrueCondition will be defined by the dependency creation procedures because many events can be determined to be FALSE by the occurrence of subsequent events. The TrueCondition of an event is herein said to be complementary to its FalseCondition, and vice versa.

Each event record 224 in table 220 includes a set of fields for the TrueCondition and a set fields for the FalseCondition of an event. These fields include a State field that indicates the status of the condition, a Changed flag for indicating if the status of the condition has changed and thus requires further processing (as discussed below), and a Complete flag for indicating whether the agent has complete knowledge of all the conjuncts which define the TrueCondition and FalseCondition of the event. These fields will be discussed in more detail below.

Event and Condition State Values

Events, once they are defined, are assigned one of the following truth values: UNDEFINED, TRUE, FALSE, PROMISED and REFUSED. PROMISED means that an event or condition has tentatively be determined to be TRUE and REFUSED means that an event or condition has tentatively been determined to be FALSE. The processing of PROMISED and REFUSED values is discussed below.

Events and the conditions for enabling those events are called "event/condition pairs", and such event condition are specified as logical implications:

premise→conclusion wherein the premise must be restricted to a single event, and the conclusion defines a condition for the event becoming TRUE (e.g., event→conclusion) or a condition for the event becoming FALSE (e.g., not(event)→ conclusion). The conclusion can be an valid boolean expression. The conclusion for an event is called the TrueCondition of the event if it constrains the event to become TRUE. Similarly, the conclusion for an event is called the FalseCondition of the event if it constrains the event to become FALSE.

To accommodate the truth value UNDEFINED the following rules are used when evaluating a condition:

UNDEFINED and TRUE=UNDEFINED

UNDEFINED and FALSE=FALSE not(UNDEFINED)=UNDEFINED

A local event can be set to TRUE or FALSE when the respective TrueCondition or FalseCondition for that local event evaluates to a value of TRUE; otherwise the truth value of a local event remains UNDEFINED. Upon a local event being TRUE or FALSE, notifications must be sent to all dependent "events", that is notifications must be sent to all other agents that have events depending on that local event, unless the notification is delayed or omitted by the message optimization procedures of the present invention. For example, consider the protocol:

a→b where event a is triggered by Agent A and event b is triggered by Agent B. Process B, after setting event b to TRUE, sends a notification to Agent A. Upon receiving that notification, Agent A can set event a to TRUE because the condition on event a evaluates to TRUE.

Conjunct Link Table

For each defined TrueCondition or FalseCondition of an event, the conjunct link table 222 stores a set of one or more records 226 that define the TrueCondition or FalseCondition. Each condition for an event is represented as a boolean expression of other events. Each such boolean expression contains at least one term, and each term of the boolean expression is either an external event or an internal event.

The fields of each record 226 in the conjunct link table 222 are as follows. The "sender event ID" field identifies an event, which can be either a local or external event, which is part of the TrueCondition or FalseCondition of another event, which is identified by the "received event ID". In other words, the receiver event is dependent on the sender event. All the link records having the same sender event are linked together as a doubly linked list by the S.FLink (sender forward link) and S.BLink (sender backward link) fields to facilitate the process of locating all the link records that need to be accessed when an event occurs. Similarly, all the link records having the same receiver event are linked together as a doubly linked list by the R.FLink (receiver forward link) and R.BLink (receiver backward link) fields to facilitate the process of locating all the link records that need to be accessed to evaluate a condition.

The True or False Condition flag field in each link record indicates whether the sender event is part of a TrueCondition or a FalseCondition for the specified receiver event.

The Condition Satisfied flag field in each link record indicates whether or not the condition associated with this record has already been resolved as being true or false. Thus, the Condition Satisfied flag will have value of TRUE if the condition is TRUE and will also have a value of TRUE if the condition is FALSE. The Condition Satisfied flag will have a value of FALSE if the condition has not yet been determined to have a value of TRUE or FALSE.

The Logic Type Flag in each link record 226 indicates whether the sender event's value is to be used with positive or negative logic when evaluating the corresponding condition. For instance, if an event's TrueCondition is defined as "b", then the link record with b as the sender event will have a Logic Type Flag equal to "P" (stored as a "1") to indicate that positive logic is used for this sender event. If the TrueCondition is defined as "not(b)", then the Logic Type Flag will be equal to "N" (stored as a "0") to indicate that negative logic is used for this sender event.

The Conjunct Number field is used to identify the various conjuncts of a condition that has multiple conjuncts. For instance, if an event's TrueCondition is defined as "b and c", where b and c are events, then the TrueCondition will have two conjuncts, each conjunct having a single term, and thus there will be two records in the link table 222 for this TrueCondition: one record with b as the sender event and having a conjunct number of 1, and one record with c as the sender event and having a conjunct number of 2. As a second example, if an event's TrueCondition is defined as "b or c", then the TrueCondition will have one conjunct having two distinct terms, and thus there will be two records in the link table 222 for this TrueCondition: one record with b as the sender event and having a conjunct number of 1, and one record with c as the sender event and having a conjunct number of 1.

In the preferred embodiment, the TrueCondition and FalseCondition, if any, of each event are "normalized" and maintained in conjunctive normal form (CNF). This means that a condition consists of a set of one or more conjuncts:

$\{C_i\} = (C_1 \text{ .AND. } C_2 \text{ .AND. } ... C_n)$ with each conjunct consisting of a set of one or more disjuncts $\{e_{ij}\}$:

$C_i = e_{1i} \text{ .OR. } e_{12} \text{ .OR. } ... e_{1m}$.

Each disjunct refers to an event, which may be either an external or internal event. Clearly, any particular conjunct may consist of a single event, or the disjunction of two or more events; and further an entire condition can consist of a single event, or it can be a more complex combination of events.

With respect to the link table 222, each conjunct of a condition is assigned a distinct conjunct number and all the records in the link table having the same sender event, receiver event, True/False Condition Type, and conjunct number represent the disjuncts of a single conjunct. The boolean logic of a condition is determined by the message optimization procedures by locating all the link records having the same sender event, receiver event and True/False Condition Type and then evaluating those records so as to evaluate the logic value of each conjunct and then logically ANDing the conjunct values to generate a condition value.

The Conjunct State field in each link record stores the value of the conjunct associated with the link record. When the conjunct has more than one disjunct, the Conjunct State of link records for all the disjuncts of the conjunct will have the same Conjunct State value.

It should be noted that the conditions for external events (i.e., external receiver events) that are represented by the conjunct link table 222 are modified in the preferred embodiment by either (A) eliminating all link records for sender event disjuncts that are not local events (or, equivalently, setting those sender events that are not local events to a "Don't Care" logic value) and (B) setting the affected conjunct's Complete flag to FALSE in the link table 222 to indicate that the agent may not receive information sufficient to completely determine the truth value of this conjunct. The reason for this modification of the condition expressions (as stored in the local knowledge database) for external events is that the present agent may not receive notifications of external events in third agents, unless those events also relate to local events which would make it impossible for the agent to utilize the message optimizations of the present invention. Note that if the a conjunct is defined as "a or b", and a is set equal to Don't Care, then the conjunct is evaluated by evaluating only b.

In an alternate embodiment, the conditions for external events are modified prior to execution of the distributed computation by eliminating or setting to a Don't Care value those condition elements which represent external events that are not also condition elements for local events.

In addition, it is possible that an agent will not have complete knowledge about the conjuncts that define the condition of an external event. For instance, an agent may not know about all disjuncts making up the conjunct of an external event, in which case the agent has incomplete knowledge of at least one conjunct. In the present invention a condition of an external event is called "complete" if an agent or process knows about all the external events conjuncts, and a conjunct is called complete if an agent knows about all its disjuncts. In most cases, agents (or the process that defines the dependencies between the agents of a distributed computation) will know that a certain condition is complete. For example, an agent has complete knowledge of the FalseCondition of an external event which is known to be always TRUE because no constraints have been defined on the event becoming FALSE. Additionally, in most cases it is also known that an agent's knowledge of all conjuncts is complete. However, incomplete conjuncts may result when already existing conjuncts are modified by adding new constraints (i.e., new agent dependencies) to an existing protocol.

As mentioned above, the add/drop/modify dependency procedures 190 modify the contents of the local knowledge databases 184 of the specified agents so as to establish specified dependencies between the specified agents. More particularly, for each dependency created between two agents, an equivalent set of event records and link records are created by the add dependency procedures in the local knowledge databases of both agents that are parties to the created dependency. For dependencies that involve more than two agents, such as a dependency of one agent on events in either of two other agents, equivalent event records and link records are created in the local knowledge databases of all the agents that are parties to the created dependency. However, when a condition for an external event is another external event, that other external event is set to a Don't Care value in the link table, as discussed above.

Analyzing Events and Conditions

Each agent, when analyzing the states of events and their conditions makes the following assumptions:

1. Agents know about all conditions associated with local events;
2. Agents do not necessarily know about all conditions associated with external events.

As is implied by the above discussion, in accordance with the present invention agents (also called processes) distinguish between external events and local events. Local events are triggered by the agent itself. External events are triggered by other agents. Agents receive notifications from other agents about the outcome of external events. Each agent processes those notifications not only to determine which local events are enabled by those notifications, but also to make inferences about external event states in other agents.

In particular (see pseudocode for Flush Messages Procedure, below), in accordance with the present invention, before sending a notification to another agent which that other agent may or may not need to enable an external event, the sending agent checks the state of that external event and state of the conditions (i.e., the TrueCondition and FalseCondition) associated with external event. If the outcome of the external event is already known, all further notifications that are needed only for that external event are omitted. If the locally known condition for the external event depends on a local event, all outgoing notifications for that external event are delayed.

Handling PROMISED and REFUSED Messages

An event whose conditions (i.e., TrueCondition and FalseCondition) evaluate to UNDEFINED can be set tentatively TRUE by assigning it the truth value PROMISED, or set tentatively FALSE by assigning it the truth value REFUSED. It is assumed herein that an Agent receiving a tentative truth value in a notification knows the conditions under which the tentative truth value becomes final. This is generally a good assumption because all "promise" notifications in distributed computations are promises to perform an event if the receiving agent also promises to perform one or more corresponding events. Generally, definition of the conditions under which a tentative truth value becomes a final truth value must be defined (e.g., in the Agent's local knowledge database 184) prior to receipt of the tentative notification. Knowledge of those conditions enables the receiving Agent to identify the conditions which can be resolved by the notification.

When a PROMISED or REFUSED notification is received, the receiving Agent uses that notification to resolve only those conditions which would become TRUE if the condition of the sending event were to become TRUE. An agent can send a promise notification for an event only if the only unresolved events of the promised event's true condition are mutually dependent with the promised event. If the mutually dependent event or events in the receiving agent evaluates to TRUE, the tentative truth value is guaranteed to become the final truth value of the sending event. In other words, a PROMISE or REFUSED notification is defined to be a promise by an agent that an event will become TRUE or FALSE, respectively, if the agent receiving the message does not have a local event that forces the opposite truth value to be adopted. Thus, from the perspective of the agent receiving a PROMISE or REFUSED notification, the tentative truth value is as good as a final truth value. No further notifications regarding that event need to be received because its final truth value can be determined by locally performed inferences.

For example, consider the following protocol:

$c \rightarrow b$ $a \rightarrow b$ $b \rightarrow a$ where events a and c are triggered by Agent A and event b is triggered by Agent B. Agent B is allowed to tentatively set the truth value of event b to TRUE and to send a corresponding PROMISE notification to Agent A, to resolve the condition associated with event a. This PROMISE can be made by Agent B because event a only becomes TRUE if the remaining condition of event b (i.e., the value of event a) evaluates to TRUE. The PROMISE notification, however, cannot be used by Agent A to resolve the condition associated with event c because event c is not mutually dependent with event b. In other words, when Agent A receives the PROMISE notification, it looks in its local knowledge database 184 to determine what the remaining conditions are for the promised event b, and then it uses that PROMISE notification to evaluate only those local events whose TrueCondition or FalseCondition becomes TRUE if the remaining condition of the promised event becomes TRUE. Subsequently, however, after Agent A sets the final truth value of event a, Agent A can use its local knowledge to determine the truth value of event b (see discussion of "Check External Conditions" procedure, below). That local knowledge can then be used to determine whether event c can be set to TRUE or must be set to FALSE.

Upon the occurrence of an event (i.e., a local event or any external events for which a notification has been received), all conditions with a truth value of UNDEFINED that refer to the event are evaluated by the agent. If the event causes a condition of an external event (e.g., the TrueCondition of the event) to become FALSE, a notification is sent to the agents which depend on that event if the complementary condition (e.g., the FalseCondition) evaluates to a truth value of TRUE. If the condition of the external event remains UNDEFINED, sending a notification of the event is delayed. Note that undefined external events in other agents (herein called third party agents) that are elements of an external event's condition will not cause a message from the present agent to be delayed, since those conditions elements are treated as "Don't Care" values when evaluating the relevant condition.

If a condition evaluates to FALSE due to a complete conjunct (see the discussion below of the Check External Conditions procedure), and the complementary condition is complete and evaluates to TRUE, the value of the external event is set in the local knowledge base to TRUE or FALSE depending on whether it was the TrueCondition or FalseCondition which evaluated to a value of True.

Receive Message Procedure

A pseudocode representation of the receive message procedure is shown in Table 1. When an event notification is received from an other agent, the notification is compared with the information in the local knowledge database to see if the notification contradicts the local knowledge. If the notification is consistent with the local knowledge, then the information in the local knowledge database is updated with the information in the notification. If the notification is inconsistent with the local knowledge, an error is returned. More specifically, four different consistency checks are performed, depending on whether the notification specifies that an external event EventX is PROMISED, REFUSED, TRUE or FALSE.

When the event notification specifies that event EventX is PROMISED, the local knowledge database is examined to determine whether the events contained in EventX's TrueCondition are mutually dependent with EventX. If so, set Event.TrueCondition.State=PROMISED. If not, an error is return.

When the event notification specifies that event EventX is REFUSED, the local knowledge database is examined to determine whether the events contained in EventX's FalseCondition are mutually dependent with EventX. If so, set Event. FalseCondition.State=REFUSED. If not, an error is return.

When the event notification specifies that event EventX is TRUE, the TrueCondition of that event is evaluated. If the TrueCondition's state is undefined and the agent has complete knowledge of the TrueCondition's structure and sufficient local knowledge of the event elements of the TrueCondition to completely determine the TrueCondition's truth value (in which case CompleteFlag is equal to TRUE), an error is returned.

When the event notification specifies that event EventX is FALSE, the FalseCondition of that event is evaluated. If the FalseCondition's state is undefined and the agent has complete knowledge of the FalseCondition's structure and sufficient local knowledge of the event elements of the FalseCondition to completely determine the FalseCondition's truth value (in which case CompleteFlag is equal to TRUE), an error is returned.

If the event notification is found to be not inconsistent with the information in the local knowledge database, the state of the event EventX is updated to equal the state specified in the received notification. Finally, all events which depend on EventX are re-evaluated in light of EventX's new state. In some instances this will cause the TrueCondition or FalseCondition of a local event to become TRUE, and thus for the local event to become TRUE, FALSE, PROMISED or REFUSED, Whenever the state of a local event changes value, the Check External Conditions Procedure is invoked by the agent interface program 124.

Check External Conditions Procedure

A pseudocode representation of the check external conditions procedure is shown in Table 2. When the state of a local event EventL changes value, all external events EventE listed in the local knowledge database that depend on that local event EventL are evaluated by the Check External Conditions Procedure as follows.

If the external event already has a state of TRUE or FALSE, no further evaluation of that external event is performed. Otherwise the TrueCondition and FalseCondition of the external event EventX are evaluated.

If the TrueCondition of the external event EventX has not previously been determined to be True or False, the TrueCondition is re-evaluated in light of the new state value for the local event EventL. If the value of the TrueCondition changes as the result of this re-evaluation, then the Changed flag for the TrueCondition is set.

If the external event EventX previously had a state equal to PROMISED, the state of EventX is set to TRUE if the TrueCondition of the external event EventX is TRUE. Furthermore, if EventX's state is set to TRUE, the procedure puts onto a scheduler queue (which is part of the finite state machine interface program 124) a call to the local knowledge updating program 182 to re-evaluate all events that depend on external event EventX.

If EventX's TrueCondition is determined to be FALSE and the FalseCondition is determined to be TRUE and to have been "completely resolved", then EventX's state is set to FALSE and the procedure puts onto a scheduler queue a call to the local knowledge updating program 182 to re-evaluate all events that depend on external event EventX. A condition is determined to be "completely resolved" when (A) all the conjunct elements are known, and (B) the final truth value of all the conjuncts can be determined from local knowledge.

Next, if the FalseCondition of the external event EventX has not previously been determined to be True or False, the FalseCondition is re-evaluated in light of the new state value for the local event EventL. If the value of the FalseCondition changes as the result of this m-evaluation, then the Changed flag for the FalseCondition is set.

If the external event EventX previously had a state equal to REFUSED, the state of EventX is set to FALSE if the FalseCondition of the external event EventX is TRUE. Furthermore, if EventX's state is set to TRUE, the procedure puts onto the scheduler queue a call to the local knowledge updating program 182 to re-evaluate all events that depend on external event EventX.

If EventX's FalseCondition is determined to be FALSE and the TrueCondition is determined to be TRUE and to have been completely resolved, then EventX's state is set to TRUE and the procedure puts onto a scheduler queue a call to the local knowledge updating program 182 to re-evaluate all events that depend on external event EventX.

Finally, the FlushMessages procedure is called to initiate the transmission of notifications about local events on which the external event EventX depends. The Check External Conditions procedure described above is repeated for each external event that depends on the local event EventL.

Flush Messages Procedure

A pseudocode representation of the Flush Messages procedure is shown in Table 3. The Flush Messages procedure is called to send all notifications of local events that an external event EventX depends on.

The procedure first checks the Changed flag for the external event's TrueCondition. If that flag is set, indicating that the TrueCondition of the external event has changed value, and the TrueCondition has a value of TRUE or PROMISED, then notifications of all local events that satisfy disjuncts of the TrueCondition (i.e., that contributed to making the TrueCondition TRUE or PROMISED) are sent to the agent for that external event as a single message (so as to minimize the number of messages that are transmitted). If the TrueCondition for the external event is not TRUE or PROMISED, but the FalseCondition for the external event is TRUE, then notifications of the local events not satisfying the disjuncts of the external event's TrueCondition are sent to the agent for the external event. If any notifications are sent in response to this part of the message flushing procedure, the TrueCondition's Changed flag is reset.

Similarly, the Flush Message procedure checks the Changed flag for the external event's FalseCondition. If that flag is set, indicating that the FalseCondition of the external event has changed value, and the FalseCondition has a value of TRUE or REFUSED, then notifications of all local events that satisfy disjuncts of the FalseCondition (i.e., that contributed to making the FalseCondition TRUE or REFUSED) are sent to the agent for that external event. If the FalseCondition for the external event is not TRUE or PROMISED, but the TrueCondition for the external event is TRUE, then notifications of the local events not satisfying the disjuncts of the external event's FalseCondition are sent to the agent for the external event. If any notifications of local events are sent in response to this part of the message flushing procedure, the FalseCondition's Changed flag is reset.

It should be noted that until the external event's TrueCondition has a state of TRUE or PROMISED or until the external event's FalseCondition has a state of TRUE or REFUSED, all notifications of local events upon which the external event depends are delayed. The rationale for delaying these local event notifications is that the individual local event notifications are useless to the other agent either all the local events required to make the TrueCondition TRUE or PROMISED have occurred, or all the local events required to make the FalseCondition TRUE or REFUSED have occurred. In addition, it is more efficient to send several local event notifications as a single message than to send several separate messages. Furthermore, other external events may occur that resolve the state of the external event, making it unnecessary to send the local event messages. In the latter case, sending local event notifications that are not sufficient to satisfy the external event's TrueCondition or FalseCondition is a waste of system resources since those notifications do not result in changing the state of the other agent. Of course, if a plurality of external events depend on the same local event, notifications of the local event may be transmitted by the Flush Messages procedure to enable any one of those external events, and thus the other agent may have some event conditions that are partially satisfied by event notifications from the present agent.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

PSEUDOCODE FOR RECEIVE MESSAGE PROCEDURE

```
/*   After an event notification is received from another agent, the
     notification is compared with the information in the local
     knowledge database to see if the notification contradicts the
     local knowledge. If the notification is consistent with the local
     knowledge, then the information in the local knowledge
     database is updated with the information in the notification. If
     the notification is inconsistent with the local knowledge, an
     error is returned.                                               */
Receive Notification Message (EventX.Notification.State) for a
specified event, EventX, from another Agent.
/*   Tentative truth value Notifications: check for mutually
     dependent events.                                                */
If   (EventX.Notification.State = PROMISED) {
     Evaluate EventX.TrueCondition.State
     /*   Check local knowledge database to determine whether
          the events contained in EventX.TrueCondition are
          mutually dependent with EventX. If so, set
          Event.TrueCondition.State = PROMISED.                       */
     If EventX.Notification.State ≠ EventX.TrueCondition.State
          return ERROR
     }
If   (EventX.Notification.State = REFUSED) {
     Evaluate EventX.FalseCondition.State
     /*   Check local knowledge database to determine whether
          the events contained in EventX.FalseCondition are
          mutually dependent with EventX. If so, set
          Event.FalseCondition.State = REFUSED.                       */
     If EventX.Notification.State ≠ EventX.FalseCondition.State
          return ERROR
     }
If   (EventX.Notification.State = TRUE) {
     CompleteFlag = Resolved
     (Evaluate EventX.TrueCondition.State)
     If ((EventX.TrueCondition.State = UNDEFINED) .AND.
     CompleteFlag)
          return ERROR
     }
If   (EventX.Notification.State = FALSE) {
     CompleteFlag = Resolved(Evaluate
     EventX.FalseCondition.State)
     If ((EventX.FalseCondition.State = UNDEFINED) .AND.
     CompleteFlag)
          return ERROR
     }
EventX.State = EventX.Notification.State
Evaluate all Events which depend on EventX
```

TABLE 2

PSEUDOCODE FOR CHECK EXTERNAL CONDITIONS PROCEDURE

```
Whenever a local event, EventL, becomes TRUE, FALSE, PROMISED or
REFUSED, DO:
Evaluate all external event conditions which depend on EventL.
For each evaluated external event condition (EventE.TrueCondition or
EventE.FalseCondition), DO:
    {
    Previous.TrueCondition.State = EventE.TrueCondition
    Previous.FalseCondition.State = EventE.FalseCondition
    /* If outcome of external event is already known, return immediately. */
    If ((EventE.State = TRUE) .OR. (EventE.State = FALSE))
        continue /*end DO loop for the current EventE */
    /*Process TrueCondition: */
    If ((EventE.TrueCondition.State ≠ TRUE) and
        EventE.TrueCondition.State ≠ FALSE)
        {
    /*  Resolve TrueCondition with truth value of local event. */
        CompleteFlag = Resolved(EventE.TrueCondition,EventL);
    /*  If the resolved TrueCondition is TRUE, the CompleteFlag is true
        only if all conjuncts of the TrueCondition are known and all the
        conjuncts are known to be TRUE based on events known to this
        agent.
        If the TrueCondition is FALSE, the CompleteFlag is true if the
        agent has complete knowledge of at least one conjunct and that
        conjunct is FALSE.                                                      */
    /*  The Resolved procedure sets EventE.TrueCondition.Changed to
        TRUE if the TrueCondition value is changed.                             */
        If  ((EventE.State = PROMISED) .AND.
            (EventE.TrueCondition.State = TRUE)
            {
            EventE.State = TRUE;
            Schedule (Evaluation of Events Depending on EventE)
            }
        If( CompleteFlag .AND.
            (EventE.TrueCondition.State = FALSE) .AND.
            (EventE.FalseCondition.State = TRUE) .AND.
            EventE.FalseCondition.Complete)
            {
            EventE.State = FALSE;
                Schedule (Evaluation of Events Depending on EventE)
            }
        }
    /*Process FalseCondition:
    If  ((EventE.FalseCondition.State ≠ TRUE) and
        (EventE.FalseCondition.State ≠ FALSE)
        {
    /*  Resolve FalseCondition with truth value of local event. */
        CompleteFlag = resolved(EventE.FalseCondition,EventL);
    /*  If the resolved FalseCondition is TRUE, the CompleteFlag is
        TRUE only if all conjuncts of the FalseCondition are known and
        all the conjuncts are known to be TRUE based on events known
        to this agent.
        If the FalseCondition is FALSE, the CompleteFlag is TRUE if the
        agent has complete knowledge of at least one conjunct and that
        conjunct is FALSE. */
    /*  The Resolved procedure sets EventE.FalseCondition.Changed to
        TRUE if the FalseCondition value is changed */
        If  ((EventE.State = REFUSED) .AND.
            (EventE.FalseCondition.State = TRUE)
            {
            EventE.State = FALSE;
            Schedule (Evaluation of Events Depending on EventE)
            }
        If  (CompleteFlag .AND.
            (EventE.FalseCondition.State = FALSE) .AND.
            (EventE.TrueCondition.State = TRUE) .AND.
            EventE.TrueCondition.Complete
            {
            EventE.State = TRUE;
            Schedule (Evaluation of Events Depending on EventE)
            }
    }
Call FlushMessages(EventE)
}
```

TABLE 3

PSEUDOCODE FOR FLUSH MESSAGE PROCEDURE

```
Receive procedure call FlushMessages(EventE) to send messages
with respect to external event EventE
If EventE.TrueCondition.Changed
{
    If  ((EventE.TrueCondition.State = TRUE) .OR.
         (EventE.TrueCondition.State = PROMISED)
        {
        Send Notification Messages for all local events satisfying
        disjuncts of the TrueCondition;
        Reset EventE.TrueCondition.Changed;
        }
    Else
        If EventE.FalseCondition.State = TRUE
            {
            Send Notification Messages for all local events not
            satisfying disjuncts of the TrueCondition;
            Reset EventE.TrueCondition.Changed;
            }
}
If EventE.FalseCondition.Changed
{
    If  ((EventE.FalseCondition.State = TRUE) .OR.
         (EventE.FalseCondition.State = REFUSED)
        {
        Send (as a single message) Notifications for all local
        events satisfying disjuncts of the FalseCondition;
        Reset EventE.FalseCondition.Changed;
        }
    Else
        {If EventE.TrueCondition.State = TRUE
            {
            Send (as a single message) Notifications for all local
            events not satisfying disjuncts of the FalseCondition;
            Reset EventE.FalseCondition.Changed;
            }
        }
}
```

What is claimed is:

1. In a computer system, a method of performing distributed computations, the steps of the method performed by said computer system comprising:

providing cooperating agents to perform each distributed computation, each agent having an associated set of events representing state transitions among a predefined set of states, each said event having a truth value that said agent changes while performing said distributed computation, each agent further having means for sending event value notifications to other ones of said agents when said agent changes said truth value of any said event;

storing in a computer memory associated with each agent a local knowledge database, said local knowledge database including data representing conditions for changing the truth value of local events, comprising events in said each agent and data representing conditions for changing the truth value of external events, comprising events in other ones of said agents, each of said conditions being represented in said local knowledge database as a boolean expression of the truth values of specified ones of said events in specified ones of said agents; said local knowledge database further storing data representing truth values for said local and external events known to said each agent; wherein said data representing said known truth values for at least a plurality of said local and external events is initialized to represent that said truth values are Undefined;

performing each distributed computation with said agents provided for that distributed computation, including:

whenever any one of said agents changes the truth value of any one of said local events, said one agent identifying from said conditions represented in said one agent's associated local knowledge database (A) those of said external events whose condition depends on said one local event, (B) for each identified external event, other ones of said local events, if any, upon which said external events' conditions depend, and (C) the truth values of said other local events;

evaluating said condition for each said identified external event to generate a truth value for said evaluated condition; and sending notifications of said one local event and said other local events from said one agent to said agent associated with each said identified external event only when the evaluated condition associated with each said identified external event has a truth value other than an Undefined truth value.

2. The method of claim 1, said sending notifications step including preventing sending notifications of said one local event and said other local events from said one agent to said agent associated with each said identified external event when said data in said one agent's local knowledge database represents a truth value of TRUE or FALSE for each said identified external event.

3. The method of claim 1, wherein said evaluating step evaluates said boolean expression represented in said local knowledge database for said condition and excludes from said boolean expression any of said external events included in said boolean expression for which local knowledge database does not store a defined truth value.

4. The method of claim 1, said conditions represented in said local database including "true conditions" which identify when the truth values of corresponding ones of said events can be set to TRUE, as well as "false conditions" which identify when the truth values of corresponding ones of said events can be set to FALSE.

5. The method of claim 1, wherein each of said conditions represented in said local knowledge database as a boolean expression is stored in said local knowledge database in conjunctive normal form such that said each condition is represented as a set of one or more conjuncts, each said conjunct comprising a set of one or more disjuncts, wherein each said disjunct comprises one of said events.

6. The method of claim 1, including:

whenever any one of said agents receives one of said notifications sent by another of said agents, said receiving agent performs the steps of:

comparing said notification with said data stored in said local knowledge database representing truth values for said local and external events known to said receiving agent to determine whether said notification contradicts said data in said local knowledge database; and when said notification is determined by said comparing step to be consistent with said data in said local knowledge database, updating said data in said local knowledge database with said received notification.

7. The method of claim 6, said receiving agent further performing the step of:

when said received notification is determined by said comparing step to be inconsistent with said data in said local knowledge database, performing a predefined error response step.

8. The method of claim 6, said conditions represented in said local database including "true conditions" which identify when the truth values of corresponding ones of said events can be set to TRUE, as well as "false conditions" which identify when the truth values of corresponding ones of said events can be set to FALSE;

said receiving agent further performing the steps of:
  evaluating said conditions in said receiving agent's local knowledge database for each external event whose truth value as represented in said local knowledge database is not equal to TRUE or FALSE and that depends on said received notification,
  said evaluating step including updating said local knowledge database to represent an external event's truth value as TRUE when said external event's true condition evaluates TRUE and said data in said local knowledge database includes a complete representation of said external event's true condition, and
  said evaluating step including updating said local knowledge database to represent an external event's truth value as FALSE when said external event's false condition evaluates TRUE and said data in said local knowledge database includes a complete representation of said external event's false condition.

9. In computer system for performing distributed computations, comprising:
  a set of cooperating computational agents for performing each distributed computation, each agent having an associated set of events representing state transitions among a predefined set of states, each said event having a truth value that said agent changes while performing said distributed computation, each agent further having means for sending event value notifications to other ones of said agents when said agent changes said truth value of any said event;
  at least one computer memory associated with each said agent; said computer memory associated with each said agent storing a local knowledge database, said local knowledge database including data representing conditions for changing the truth value of local events, comprising events in said each agent and data representing conditions for changing the truth value of external events, comprising events in other ones of said agents, each of said conditions being represented in said local knowledge database as a boolean expression of the truth values of specified ones of said events in specified ones of said agents; said local knowledge database further including data representing truth values for said local and external events known to said each agent; wherein said data representing said known truth values for at least a plurality of said local and external events is initialized to represent that said truth values are Undefined; and
  a notification message processing module associated with each said agent, said notification message processing module including:
    condition identification means for identifying, whenever the truth value of any one of said local events for said each agent changes value, (A) those of said external events whose condition depends on said one local event, (B) for each identified external event, other ones of said local events, if any, upon which said external events' conditions depend, and (C) the truth values of said other local events;
    condition evaluating means for evaluating said condition for each said identified external event to generate a truth value for said evaluated condition; and
    message sending means for sending notifications of said one local event and said other local events from said one agent to said agent associated with each said identified external event only when the evaluated condition associated with each said identified external event has a truth value other than an Undefined truth value.

10. The system of claim 9, said message sending means including means for preventing the sending notifications of said one local event and said other local events from said one agent to said agent associated with each said identified external event when said data in said one agent's local knowledge database represents a truth value of TRUE or FALSE for each said identified external event.

11. The system of claim 9, wherein said condition evaluating means evaluates said boolean expression represented in said local knowledge database for said condition and excludes from said boolean expression any of said external events included in said boolean expression for which local knowledge database does not store a defined truth value.

12. The system of claim 9, wherein said conditions represented in said local database include "true conditions" which identify when the truth values of corresponding ones of said events can be set to TRUE, as well as "false conditions" which identify when the truth values of corresponding ones of said events can be set to FALSE.

13. The system of claim 9, wherein each of said conditions represented in said local knowledge database as a boolean expression is stored in said local knowledge database in conjunctive normal form such that said each condition is represented as a set of one or more conjuncts, each said conjunct comprising a set of one or more disjuncts, wherein each said disjunct comprises one of said events.

14. The system of claim 9, said notification message processing module associated with each said agent further including:
  message receiving means for receiving said notifications sent by other ones of said agents, for comparing said notification with said data stored in said local knowledge database representing truth values for said local and external events known to said agent receiving said message to determine whether said notification contradicts said data in said local knowledge database, and for updating said data in said local knowledge database with said received notification when said notification has been determined to be consistent with said data in said local knowledge database.

15. The system of claim 14,
  said message receiving means including means for generating a predefined error response when said received notification is determined to be inconsistent with said data in said local knowledge database.

16. The system of claim 14,
  said conditions represented in said local database including "true conditions" which identify when the truth values of corresponding ones of said events can be set to TRUE, as well as "false conditions" which identify when the truth values of corresponding ones of said events can be set to FALSE;
  said message receiving means further including means for:
    evaluating said conditions in said receiving agent's local knowledge database for each external event whose truth value as represented in said local knowledge database is not equal to TRUE or FALSE and that depends on said received notification,
    updating said local knowledge database to represent an external event's truth value as TRUE when said external event's true condition evaluates TRUE and said data in said local knowledge database includes a complete representation of said external event's true condition, and
    updating said local knowledge database to represent an external event's truth value as FALSE when said external event's false condition evaluates TRUE and said data in said local knowledge database includes a complete representation of said external event's false condition.

* * * * *